United States Patent [19]
Yamashita

[11] Patent Number: 5,659,733
[45] Date of Patent: Aug. 19, 1997

[54] SORT PROCESSING METHOD AND APPARATUS FOR SORTING DATA BLOCKS USING WORK BUFFER MERGE DATA RECORDS WHILE SEQUENTIALLY TRANSFERRING DATA RECORDS FROM WORK BUFFERS

[75] Inventor: Haruhisa Yamashita, Kawasaki, Japan

[73] Assignee: Fujitsu Limited, Kawasaki, Japan

[21] Appl. No.: 460,690

[22] Filed: Jun. 2, 1995

[30] Foreign Application Priority Data

Sep. 26, 1994 [JP] Japan .................... 6-192480

[51] Int. Cl.⁶ .................... G06F 7/30; G06F 7/36
[52] U.S. Cl. .................... 395/607; 398/617
[58] Field of Search .................... 395/600, 800, 395/250, 607, 617, 603, 602; 364/200, 900, 300; 340/172.5

[56] References Cited

U.S. PATENT DOCUMENTS

| | | | |
|---|---|---|---|
| 3,713,107 | 1/1973 | Barsamian | 340/172.5 |
| 4,514,826 | 4/1982 | Iwata et al. | 364/900 |
| 4,760,526 | 7/1988 | Takeda et al. | 395/607 |
| 4,873,625 | 10/1989 | Archer et al. | 395/607 |
| 5,084,815 | 1/1992 | Mazzario | 395/800 |
| 5,117,495 | 5/1992 | Liu | 395/607 |
| 5,175,857 | 12/1992 | Inoue | 395/800 |
| 5,237,661 | 8/1993 | Kawamura et al. | 395/250 |
| 5,349,684 | 9/1994 | Edem et al. | 395/800 |
| 5,369,762 | 11/1994 | Wolf | 395/607 |
| 5,530,855 | 6/1996 | Satoh et al. | 395/617 |

*Primary Examiner*—Thomas G. Black
*Assistant Examiner*—Charles Rones
*Attorney, Agent, or Firm*—Staas & Halsey

[57] ABSTRACT

A data transferring section creates an available buffer by transferring all of the data records in one of work buffers to at least one of the other work buffers in a case where the available work buffer cannot be obtained even by fetching and outputting all of the data records having a sort order higher than the representative record of a data block to be next fetched from the work buffers. At this time, in at least one of the work buffers in which data records are added by the above data record transferring operation, the data records in each of the work buffers are sorted in the sort order.

14 Claims, 13 Drawing Sheets

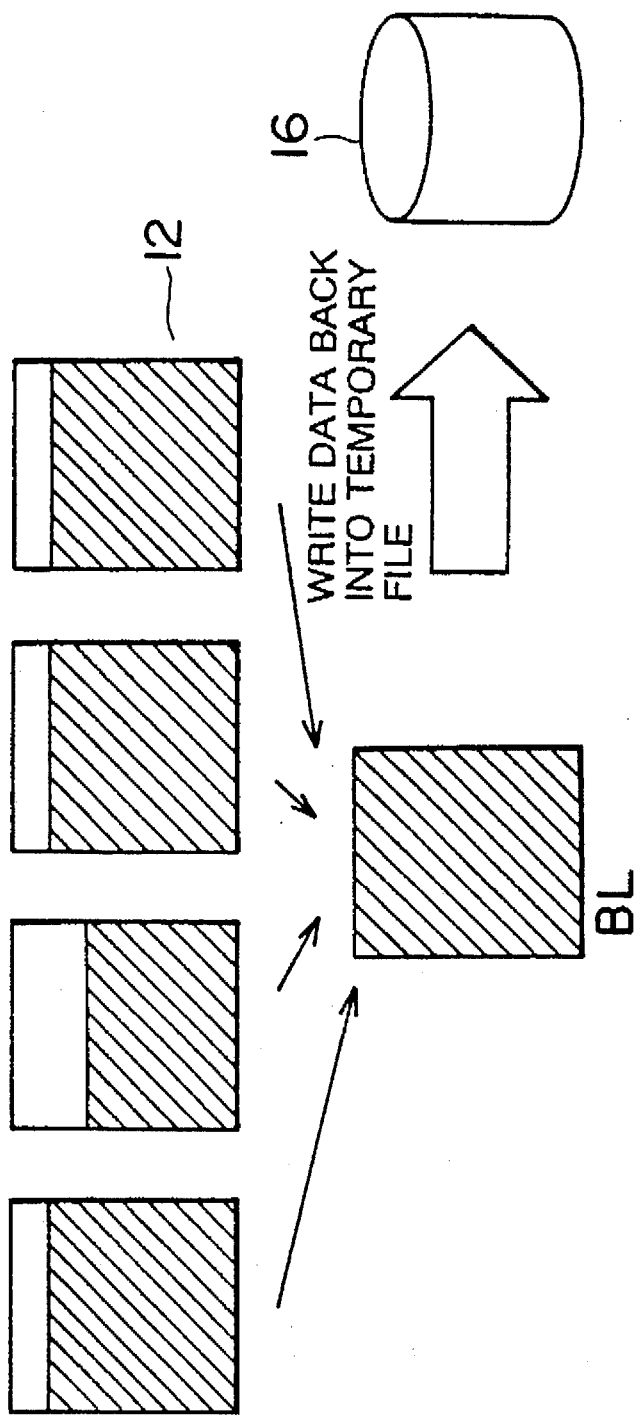

SORT PROCESSING METHOD AND APPARATUS FOR SORTING DATA BLOCKS USING WORK BUFFER MERGE DATA RECORDS WHILE SEQUENTIALLY TRANSFERRING DATA RECORDS FROM WORK BUFFERS

BACKGROUND OF THE INVENTION

1. Field of the Invention

This invention relates to a data sort process, and more particularly to a sort processing method of and apparatus for sorting all data by forming a plurality of sorted data blocks based on input data, temporarily fetching the blocks into a plurality of work buffers, merging data records while sequentially reading out the data records from the plurality of work buffers and outputting the same.

2. Description of the Related Art

In the sort process, if the amount of all data to be sorted is small and all of the data can be developed in a main memory, all of the to-be-sorted data may be developed in the main memory and the data may be sorted in a sort order in the main memory and output.

However, in many cases, the amount of all of the to-be-sorted data is larger than the capacity of the main memory and it is impossible to develop all of the to-be-sorted data in the main memory. If all of the to-be-sorted data cannot be developed in the main memory, sort of all of the data is generally effected as follows.

As shown in FIG. 1, in the first step S1, data is sequentially read out by an amount of data which can be developed in the main memory from an input file F1 in which to-be-sorted data is stored, data in each block is sorted to create a plurality of data blocks D1 constructed by sorted data groups which are discretely sorted and the data blocks are stored into an external file F2.

In the second step S2, data items of the plurality of data blocks D1 which are created in the first step S1 and discretely sorted are read out from the external file F2 and merged, all of the data is sorted and the result of sort is stored into an output file F3. In a normal case, each of the input file F1 and output file F3 is part of the external file F2.

As a merge method in the second step S2, for example, a method disclosed in Japanese Patent Disclosure (KOKAI) Publication No. S.57-90757 (the merge method is hereinafter referred to as a "block merge") and, for example, a method disclosed in Japanese Patent Disclosure (KOKAI) Publication No. H.2-75018 (the merge method is hereinafter referred to as a "buffer merge") are used.

In the block merge and buffer merge, for example, when a plurality of data blocks D1 constructed by the sorted data groups are created, index information of indices or data records having the highest sort order in the respective data blocks, that is, representative records corresponding to the head data records of the respective data blocks (since each data block is discretely sorted) is created. At the same time, a plurality of sorted data strings are created at the time of creation of the data blocks D1. In the sorted data strings, data record strings of the respective blocks are formed such that all of the records constructing the data blocks set in the index order in the data strings are arranged in the sort order throughout all of the data blocks. In this case, even if data blocks of different strings are arranged in the index order, the records in the data blocks are not always arranged in the sort order.

In the block merge and buffer merge described above, data records in the respective data blocks of the sorted strings are merged.

As indicated by an example shown in FIG. 2, in the block merge, before data is read out or fetched from a temporary file F4 which is an external file into a work buffer B1 in the main memory, index information constructed by representative records corresponding to the head data records of the respective data blocks is stored into an index area I1 set in another location of the main memory.

Since the index information is created at the same time that the sorted data blocks and strings are created, the created index information is kept in the index area of the main memory if the merge process is effected immediately after creation of the sorted data blocks and strings. If the merge process is effected not immediately after creation of the sorted data blocks and strings, the created index information is kept stored in the external file together with the sorted strings and is fetched into the index area of the main memory when the merge process is effected.

Next, the merge process in the block merge is explained with reference to FIG. 3. All of the indices in the index area I1 are sorted and data records of one block are fetched from the temporary file F4 into the work buffer B1 in the main memory in an order indicated by the indices (step S11). Then, in the work area, records in the record save area (RSA) R1 in the main memory and records in the work buffer B1 are merged and arranged (step S12). Records which have a sort order higher than the index of a block to be next fetched and which can be output among the records in the work buffer B1 are sequentially output to an output file F5 (external file) via an output buffer B2 (another area in the main memory) in the sort order by referring to the index of the index area I1 (step S13).

When it is detected that data records to be output are no more present in the work buffer B1, whether or not a space area is present in the record save area R1 is checked (step S14) and if there is a space area, the data records in the work buffer B1 are transferred into the record save area (RSA) R1 in the main memory (step S16). When data records are already stored in the record save area R1, the data records from the work buffer B1 are transferred in a merged configuration with the data records in the record save area R1. Then, whether or not a data block of records to be merged and output is present in the temporary file F4 is checked (step S17), and if the data block is present, the step S11 is effected again, a new record is fetched from the temporary file F4 into the work buffer B1 and the same processes as described above are effected for data in the work buffer B1 and record save area R1.

If it is detected in the step S14 that the record save area R1 is full, data records in the record save area R1 are written back into the temporary file F4 as a sorted data block or string (step S15) and then the step S16 is effected. When it is determined in the step S17 that no data block of records to be merged and output is present in the temporary file F4, the process is ended.

Thus, all the data is merged and output to the output file F5 via the output buffer B2.

However, the block merge has a problem that the number of record transferring operations between the work buffer B1 into which the data block is stored and the record save area R1 in the sort work area is large.

On the other hand, as indicated by an example shown in FIG. 4, in the buffer merge, work buffers B3 of a number equal to or larger than a number corresponding to the number of sorted data strings stored in a temporary file F6 are allotted in the main memory and index information constructed by representative records corresponding to the head data records of the respective data blocks is stored into an index area I2 which is the same as that described above.

All of the indices in the index area I2 are sorted and data blocks are fetched from the temporary file F6 into the work buffers B3 in the main memory in an order indicated by the indices. Then, data having a sort order higher than the index of a data block to be next fetched is read out from all of the work buffers B3 in a sort order and sequentially output to an output buffer B4 (another area in the main memory). In this case, since work buffers B3 of a number equal to or larger than a number corresponding to the number of the strings are provided, a space area into which a next data block is fetched can be obtained in one of the work buffers B3 when all the data having a sort order higher than the index of a data block to be next fetched is output.

The conventional block merge and buffer merge have the following problems. The block merge has a problem that the number of record transferring operations is large since the record is transferred between the work buffer B1 into which the data block is fetched and the record save area R1 in the sort work area each time the record is fetched. Further, in the buffer merge, the process can be effected with a small number of record transferring operations, but it cannot be applied if the number of sorted data strings exceeds the number of buffers which can be prepared, and therefore, a large number of buffers must be used.

SUMMARY OF THE INVENTION

An object of this invention is to provide a sort processing method and apparatus in which the number of buffers required is relatively small, the number of record transferring operations in a work area is small, and the merge process can be efficiently effected at a high speed.

The first aspect of a sort processing method of this invention for sorting all data by creating a plurality of sorted data blocks based on input data, temporarily fetching the data blocks into a plurality of work buffers and sequentially reading out and outputting data records from the plurality of work buffers while merging the same comprises a block fetching step of sequentially fetching a plurality of data blocks into an available buffer in a plurality of work buffers in an order corresponding to the sort order of representative records constructed by data items having the highest sort order in the respective data blocks; a sort outputting step of fetching data records which have a sort order higher than the representative record of a data block to be next fetched into the work buffer from the work buffers in the sort order and sequentially outputting the data records; and a data transferring step of providing an available buffer by transferring all of the data records in one of the plurality of work buffers into at least one of the other work buffers in a case where the available buffer cannot be obtained even by fetching and outputting all of the data records which have a sort order higher than the representative record of the data block to be next fetched from the work buffers.

The second aspect of a sort processing method of this invention for sorting all data by creating a plurality of sorted data blocks based on input data, temporarily fetching the data blocks into a plurality of work buffers and sequentially reading out and outputting data records from the plurality of work buffers while merging the same comprises a block fetching step of sequentially fetching a plurality of data blocks into an available buffer in the plurality of work buffers in an order corresponding to the sort order of representative records constructed by data items having the highest sort order in the respective data blocks; a sort outputting step of fetching data records which have a sort order higher than the representative record of a data block to be next fetched into the work buffer from the work buffers in the sort order and sequentially outputting the data records; a data transferring step of providing an available buffer by transferring all of the data records in one of the plurality of work buffers into at least one of the other work buffers in a case where the available buffer cannot be obtained even by fetching and outputting all of the data records which have a sort order higher than the representative record of the data block to be next fetched from the work buffers; and a write-back step of fetching data of one data block having a low sort order from the plurality of work buffers, temporarily writing the data back into an external file, and then effecting the data transferring step again in a case where all of the data records in one of the plurality of work buffers cannot be transferred into at least one of the other work buffers in the data transferring step.

In the sort processing method of the first or second aspect of this invention, the data transferring step may include a step of selecting one of a plurality of work buffers which is first subjected to the data record fetching process as a work buffer of data record transferring source, or a step of selecting one of a plurality of work buffers which stores the smallest number of remaining data records as a work buffer of data record transferring source. Further, in either of the above cases, the data transferring step may further include a step of selecting at least one work buffer as a work buffer of data record transferring destination from a plurality of work buffers except the work buffer of data record transferring source in the order in which the data block is fetched, or a step of selecting at least one work buffer as a work buffer of data record transferring destination from a plurality of work buffers except the work buffer of data record transferring source in the order in which the number of remaining data records stored in the work buffer is increased.

Further, in the sort processing method according to the second aspect of this invention, the write-back step may be a step of fetching data records having a low sort order among the data records in the respective buffers by a preset equal number from the plurality of work buffers and writing the fetched data records back into an external file.

The first aspect of a sort processing apparatus of this invention comprises a string creating section for creating a plurality of sorted data blocks based on input data; an external file for storing the plurality of sorted data blocks and sort result output data; a plurality of work buffers for temporarily storing the sorted data blocks fetched from the external file; an output buffer for temporarily storing sort result output data and then supplying the same to the external file; a block fetching section for sequentially fetching the plurality of data blocks in an order corresponding to the sort order of representative records constructed by data items having the highest sort order in the respective data blocks and storing the same into an available one of the plurality of work buffers; a sort outputting section for fetching data records which have a sort order higher than the representative record of a data block to be next fetched into the work buffer from the work buffers in the sort order and sequentially outputting the data records to the output buffer; and a data transferring section for transferring all of the data records in one of the plurality of work buffers into at least one of the other work buffers in a case where the available buffer cannot be obtained even by fetching and outputting all of the data records which have a sort order higher than the representative record of the data block to be next fetched from the work buffers.

The second aspect of a sort processing apparatus of this invention comprises a string creating section for creating a plurality of sorted data blocks based on input data; an external file for storing the plurality of sorted data blocks and sort result output data; a plurality of work buffers for temporarily storing the sorted data blocks fetched from the external file; an output buffer for temporarily storing sort result output data and then supplying the same to the external file; a block fetching section for sequentially fetching the plurality of data blocks in an order corresponding to the sort order of representative records constructed by data items having the highest sort order in the respective data blocks and storing the same into an available one of the plurality of work buffers; a sort outputting section for fetching data records which have a sort order higher than the representative record of a data block to be next fetched into the work buffer from the work buffers in the sort order and sequentially outputting the data records to the output buffer; a data transferring section for transferring all of the data records in one of the plurality of work buffers into at least one of the other work buffers in a case where the available buffer cannot be obtained even by fetching and outputting all of the data records which have a sort order higher than the representative record of the data block to be next fetched from the work buffers; and a write-back section for fetching data of one data block having a low sort order from the plurality of work buffers and temporarily writing the data back into the external file in a case where the data transferring section cannot transfer all of the data records in one of the plurality of work buffers into at least one of the other work buffers.

In the sort processing apparatus of the first or second aspect of this invention, the data transferring section may include an element for selecting one of the plurality of work buffers which is first subjected to the data record fetching process as a work buffer of data record transferring source, or an element for selecting one of the plurality of work buffers which stores the smallest number of remaining data records as a work buffer of data record transferring source. Further, in either of the above cases, the data transferring section may further include an element for selecting at least one work buffer as a work buffer of data record transferring destination in the order in which the data block is fetched from the plurality of work buffers except the work buffer of data record transferring source, or an element for selecting at least one work buffer as a work buffer of data record transferring destination from the plurality of work buffers except the work buffer of data record transferring source in the order in which the number of remaining data records stored in the work buffer is increased.

Further, in the sort processing apparatus according to the second aspect of this invention, the write-back section may include an element for fetching data records having a low sort order among the data records in the respective buffers by a preset equal number from the plurality of work buffers and writing the fetched data records back into the external file.

In the sort processing method and apparatus according to this invention, when all data is sorted by temporarily fetching a plurality of sorted data blocks created based on input data into a plurality of work buffers and sequentially reading out and outputting the data records from the plurality of work buffers while merging the same, the following process is effected. The plurality of data blocks are sequentially fetched into an available buffer in the plurality of work buffers in an order corresponding to the sort order of representative records constructed by data items having the highest sort order in the respective data blocks and then the data records which have a sort order higher than the representative record of a data block to be next fetched into the work buffer are fetched from the work buffers and sequentially output in the sort order, and all of the data records in one of the plurality of work buffers are transferred into at least one of the other work buffers in a case where the available work buffer cannot be obtained even by fetching and outputting all of the data records which have a sort order higher than the representative record of the data block to be next fetched from the work buffers. Thus, the sort processing method and apparatus according to this invention effect the highly efficient and high-speed merge process by use of a less number of work buffers.

Further, in a case where all of the data records in one of the plurality of work buffers cannot be transferred into at least one of the other work buffers, data of one data block having a low sort order is fetched from the plurality of work buffers and the data is temporarily written back into the external file so that the highly efficient and high-speed merge process can be attained by use of a less number of work buffers while the processible data amount is prevented from being limited by the capacity of the work buffer.

Further, the efficiency of the process can be enhanced by selecting one of the plurality of work buffers which is first subjected to the data record fetching process as a work buffer of data record transferring source, or by selecting one of the plurality of work buffers which stores the smallest number of remaining data records as a work buffer of data record transferring source. Further, in either of the above cases, the efficiency of the process can be further enhanced by selecting at least one work buffer as a work buffer of data record transferring destination in the order in which the data block is fetched from the plurality of work buffers except the work buffer of data record transferring source, or by selecting at least one work buffer as a work buffer of data record transferring destination from the plurality of work buffers except the work buffer of data record transferring source in the order in which the number of remaining data blocks stored in the work buffer is increased.

At the time of write back, the efficiency of the process can be further enhanced by fetching data records having a low sort order among the data records in the respective buffers by a preset equal number from the plurality of work buffers and writing the fetched data records back into an external file.

BRIEF DESCRIPTION OF THE DRAWINGS

Other objects and advantages of the invention will become apparent during the following discussion in conjunction with the accompanying drawings, in which:

FIG. 13 is a schematic diagram showing the process of writing a data record back into an external file to illustrate the merge process in the system of FIG. 11.

DETAILED DESCRIPTION OF THE PREFERRED EMBODIMENTS

There will now be described embodiments of this invention with reference to the accompanying drawings.

<First Embodiment>

Figure 1:
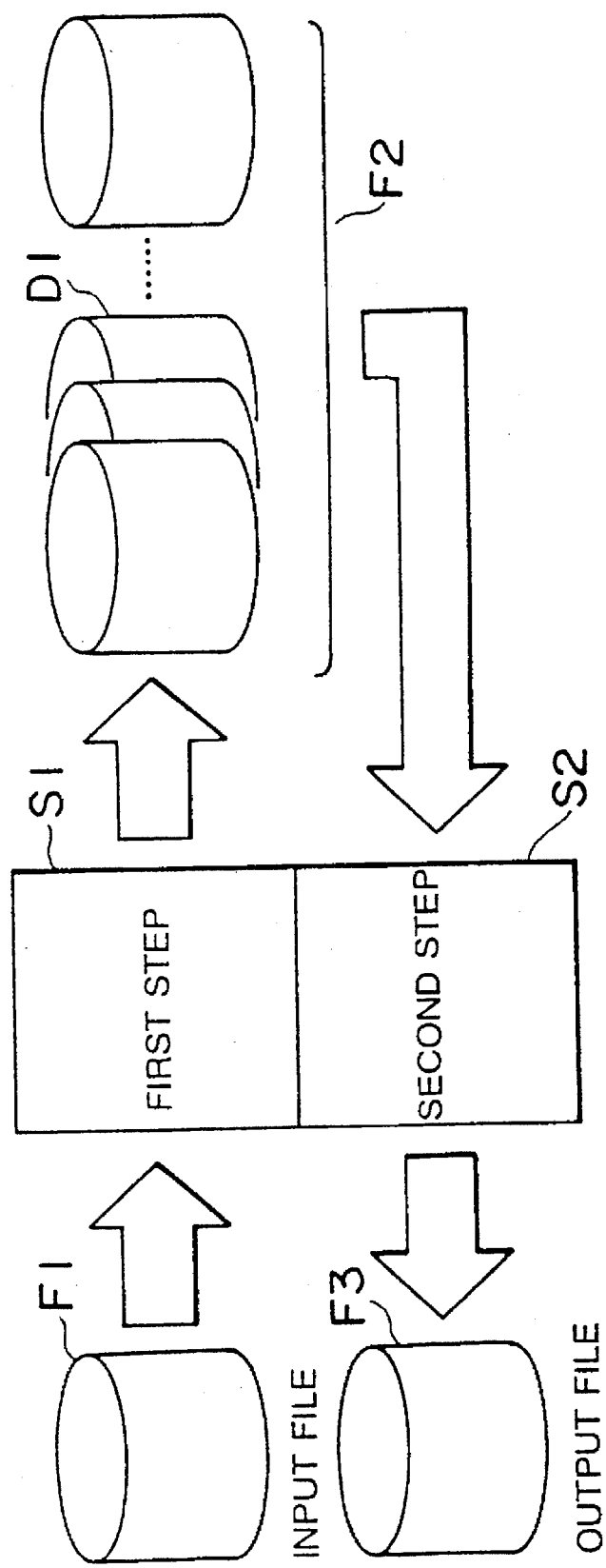
FIG. 1 is a schematic diagram for schematically illustrating the sort process in the conventional system.
Figure 2:
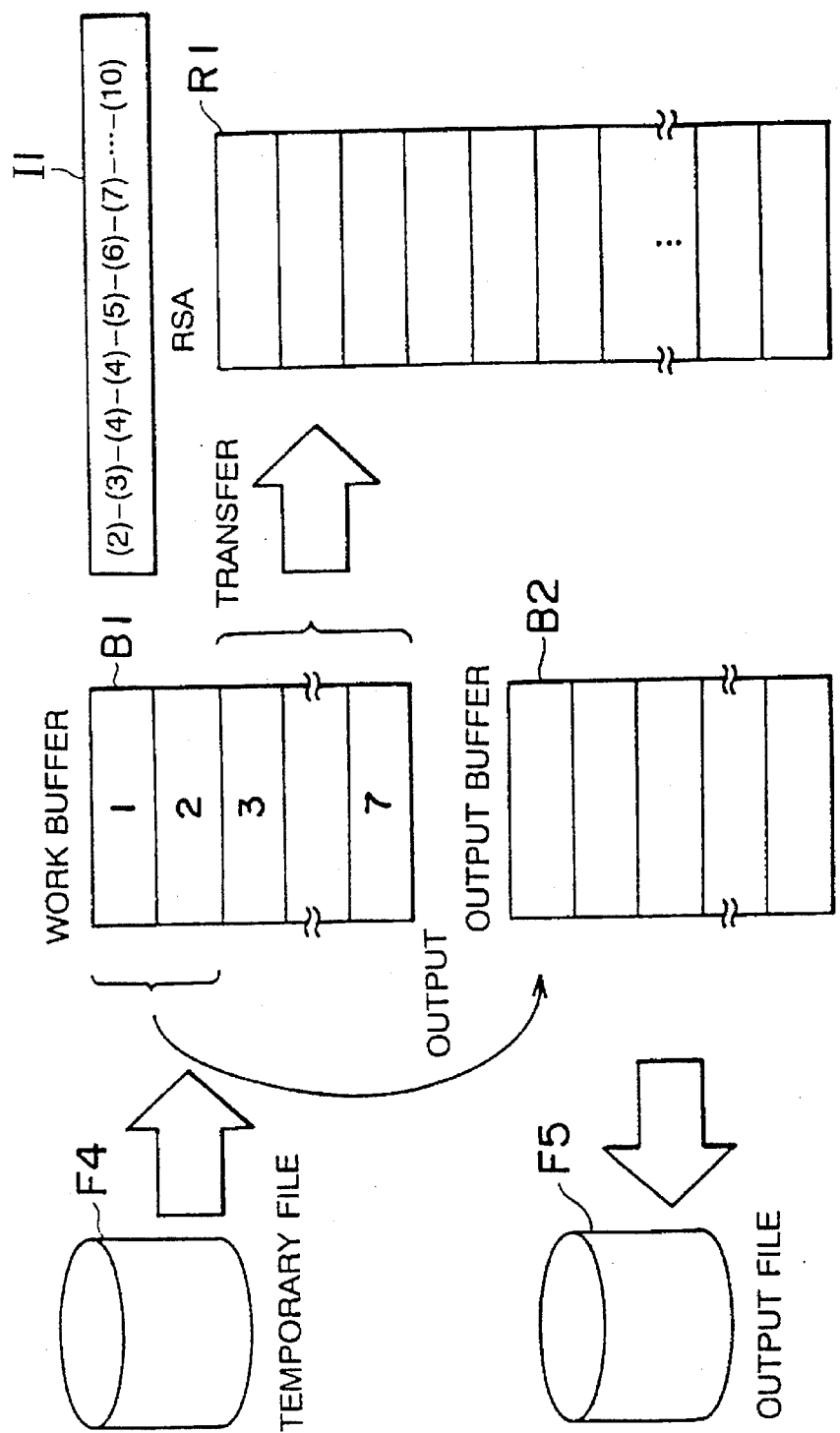
FIG. 2 is a schematic diagram for schematically illustrating the sort process by the block merge in the conventional system.
Figure 3:
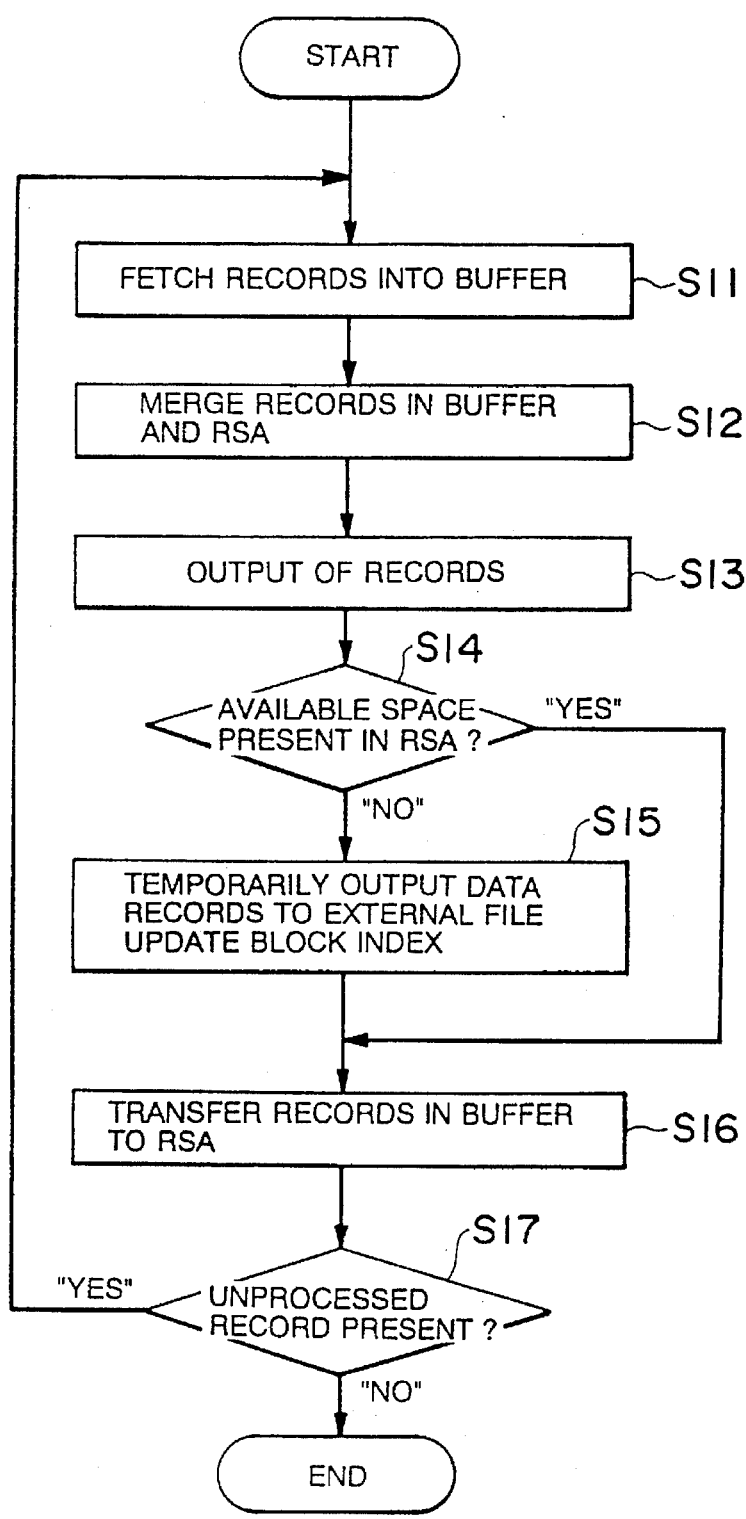
FIG. 3 is a flowchart for illustrating the sort process by the block merge in the conventional system.
Figure 4:
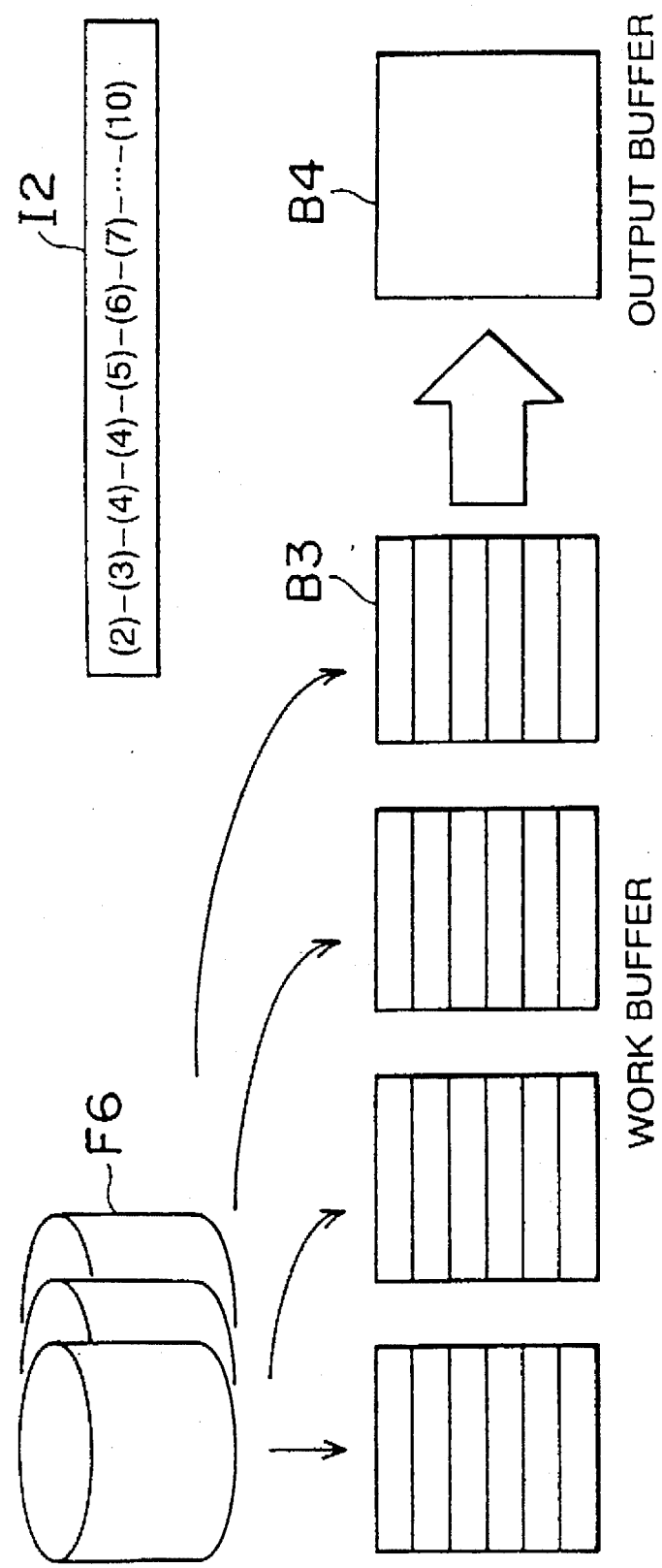
FIG. 4 is a schematic diagram for schematically illustrating the sort process by the buffer merge in the conventional system.
Figure 5:
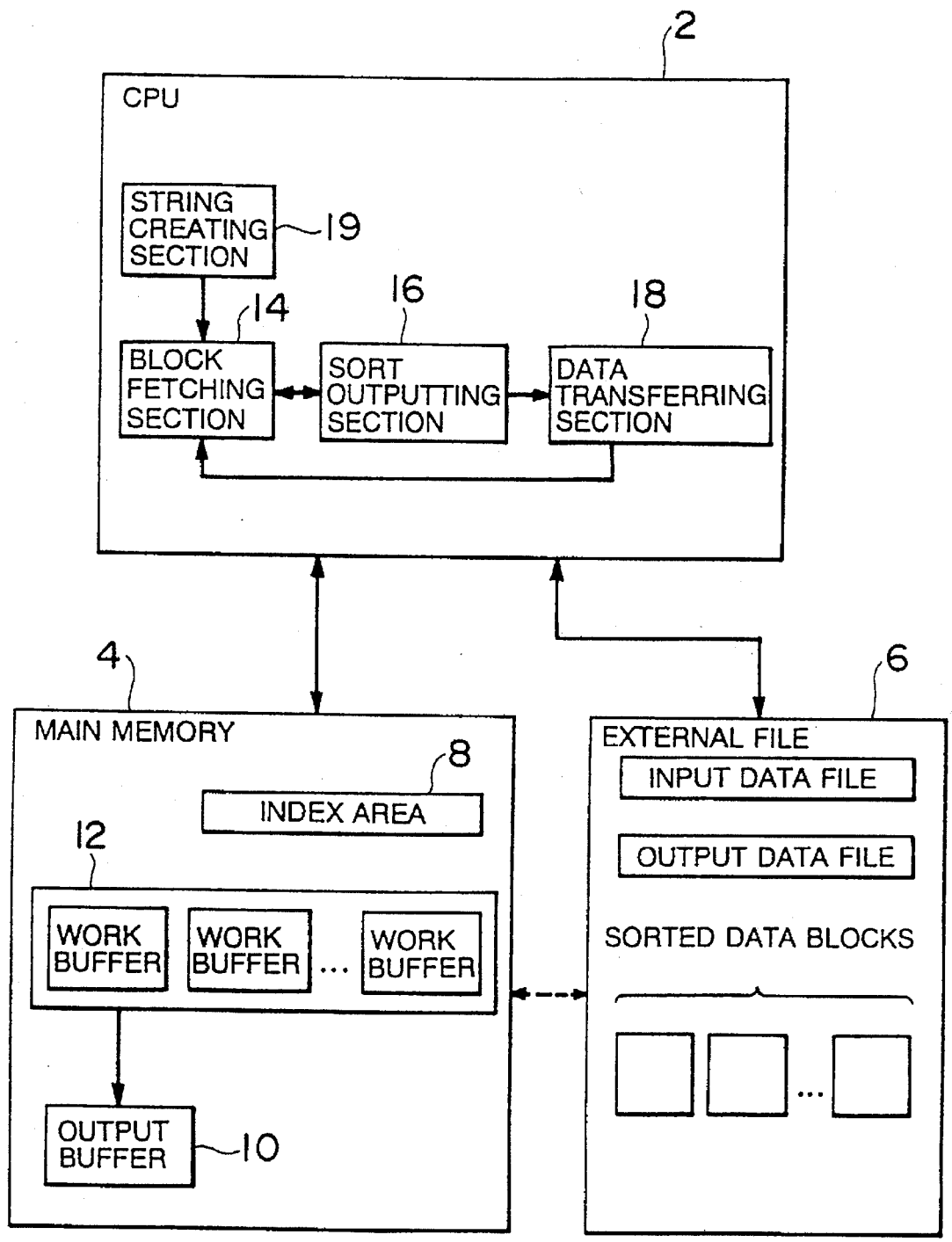
FIG. 5 is a block diagram showing the construction of a first embodiment of a sort processing system according to this invention.

FIG. 5 shows the construction of a sort processing system according to a first embodiment of this invention.

The sort processing system of FIG. 5 includes a CPU (Central Processing Unit) 2, main memory 4 and external file 6.

The external file 6 stores an input data file, a plurality of sorted data blocks created based on input data and an output data file of sort result. In this case, at the time of creation of the sorted data blocks, if index information constructed by representative records corresponding to data records having the highest sort order in the respective data blocks is created, the index information is also stored in the external file 6.

The main memory 4 has an index area 8, output buffer 10 and a plurality of work buffers 12.

The work buffers 12 temporarily store sorted data blocks fetched from the external file 6 for each data block. That is, each of the work buffers 12 has a capacity of one data block and can store one data block.

The output buffer 10 temporarily stores output data of sort result created by the merge process. Output data temporarily stored in the output buffer 10 is output to the external file 6 for every preset amount.

The index area 8 holds representative records constructed by records having the highest sort order in the respective data blocks held in the external file 6 and representative records read out from the external file 6 and held in the work buffers 12 of the main memory 4. The representative record stored in the index area 8 for each data block may be created at the time of creation of the sorted data block and stored into the external file 6, and if it is not previously created, it may be created before starting the merge process and stored in the index area 8. In either case, the representative record for each data block is previously sorted in the sort order and stored in the index area 8.

The CPU 2 includes a block fetching section 14, sort output section 16, data transferring section 18 and string creating section 19.

The string creating section 19 fetches a preset number of records at a time from the input data file of the external file 6, sorts the same to create a sorted data block and writes the sorted data block into the external file 6.

The block fetching section 14 fetches the data blocks in an order corresponding to the sort order of the representative records stored in the index area 8 and sequentially stores each block into an available one of the work buffers 12 in the main memory 4.

The sort output section 16 fetches data records having a sort order higher than the representative record of a data block to be next fetched into the work buffer 12 in the sort order from the work buffer 12 and sequentially outputs the data records to the output buffer 10 in the main memory 4.

The data transferring section 18 creates an available buffer by transferring all of the data records in one of the work buffers 12 into at least one of the other work buffers 12 in a case where the available buffer cannot be obtained even by fetching and outputting all of the data records having a sort order higher than the representative record of the data block to be next fetched from the work buffers. At this time, in at least one of the work buffers 12 in which data records are added by transfer of the data records, data records in each of the work buffers 12 are sorted in the sort order.

Figure 6:
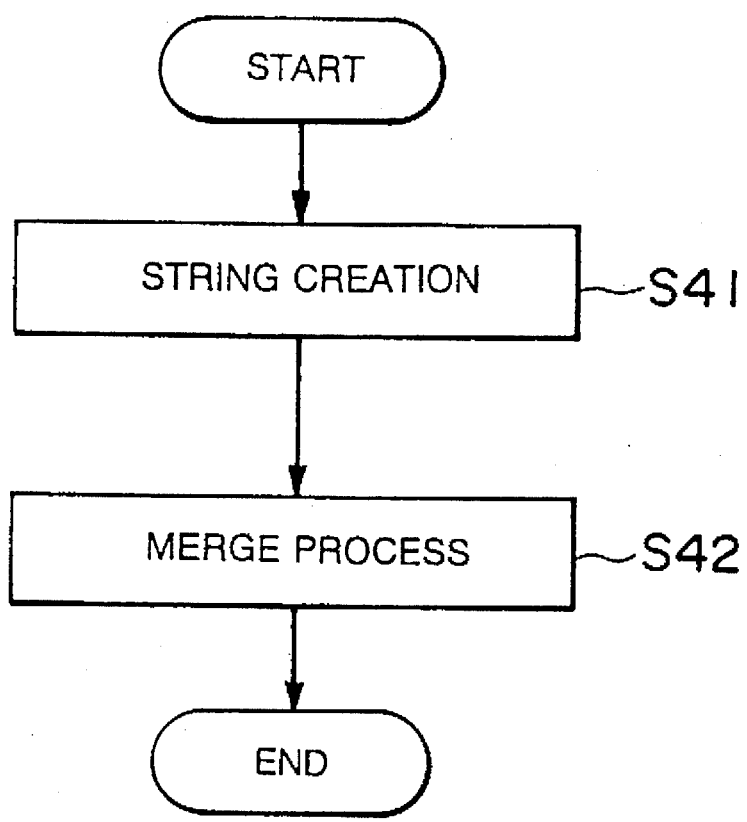
FIG. 6 is a flowchart for illustrating the sort process in the system of FIG. 5.
Figure 7:
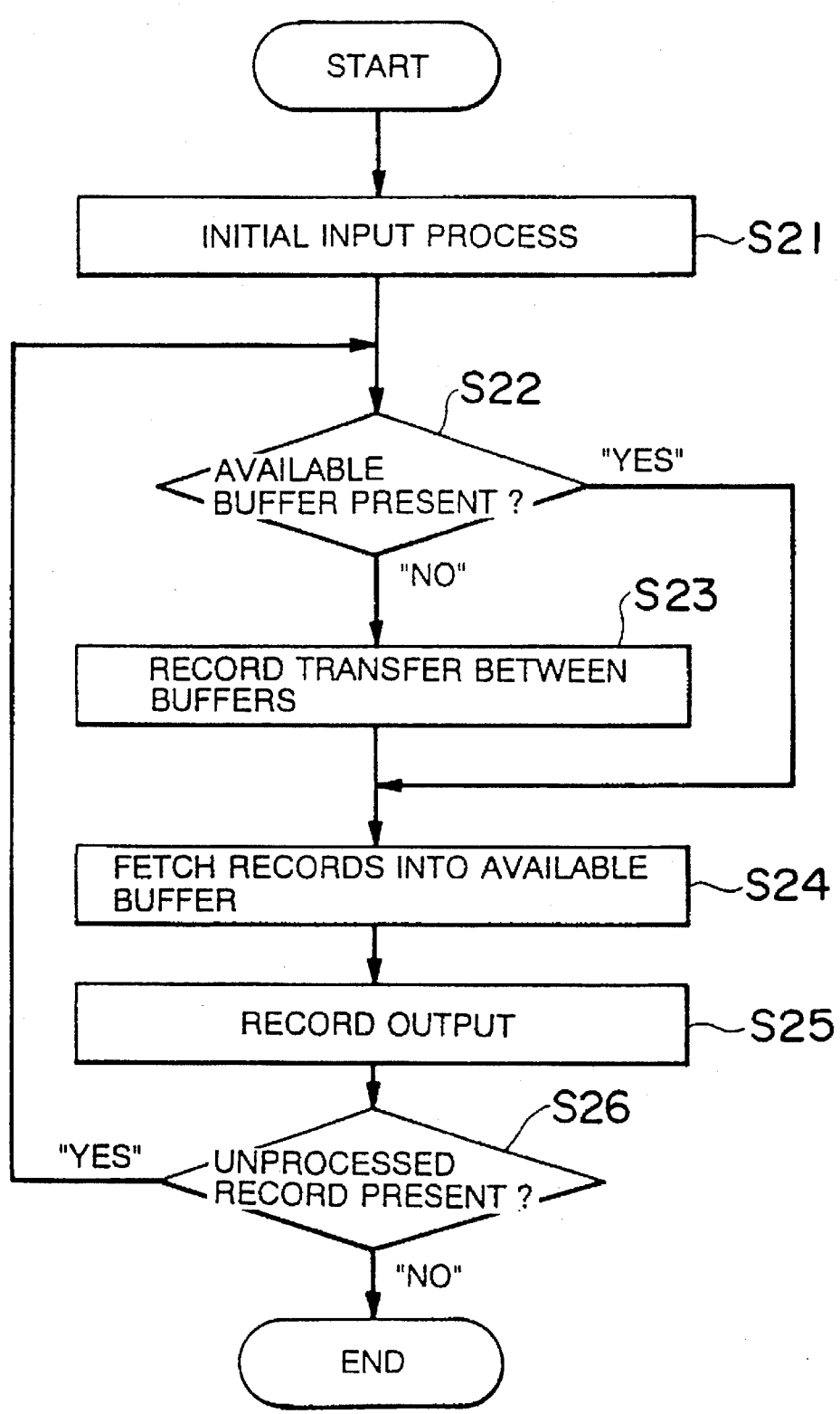
FIG. 7 is a flowchart for illustrating the merge process in the system of FIG. 5.
Figure 8:
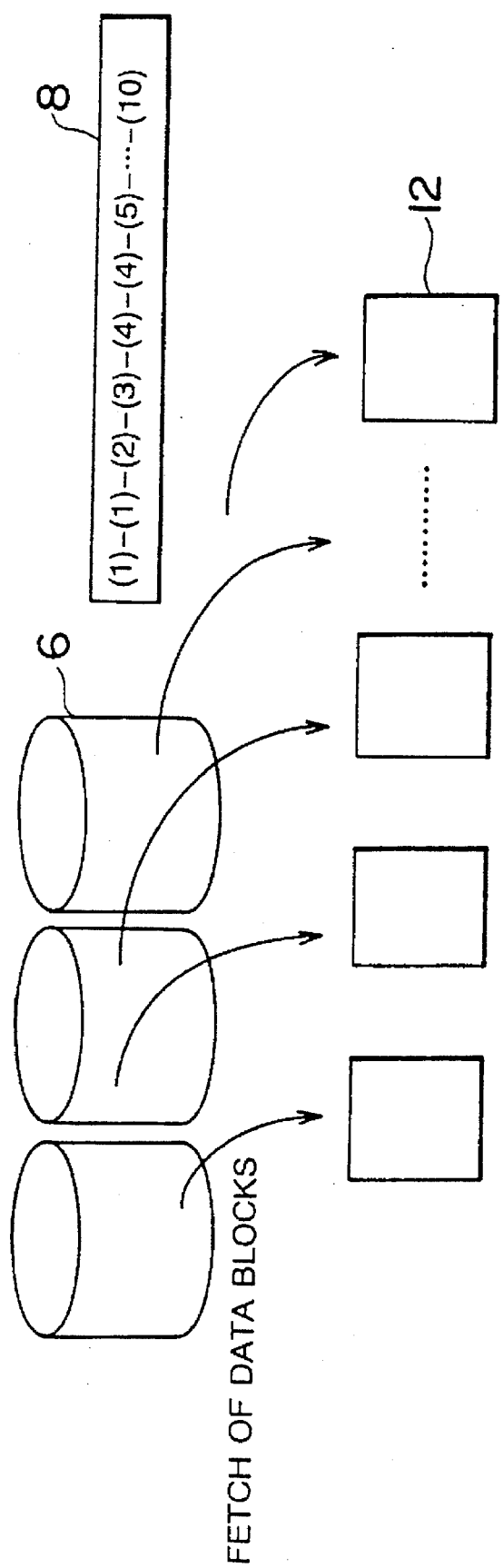
FIG. 8 is a schematic diagram showing the process of fetching a data record to illustrate the merge process in the system of FIG. 5.

Next, the operation of the sort processing system with the construction shown in FIG. 5 is explained with reference to the flowcharts shown in FIGS. 6 and 7 and the schematic diagrams shown in FIGS. 8, 9 and 10.

The sort process includes a string creating process (step S41) and a merge process (step S42).

The string creating process is a process for fetching a preset number of records at a time from the input data file and sorting the records to create a sorted data block, and since this technique is well known in the art, the detail explanation therefor is omitted here.

When the merge process is started, the block fetching section 14 first fetches the representative records of the respective data blocks, that is, indices into the representative record fetching index area 8 of the main memory 4 and sorts the representative records in the index area 8 in a sort order as an initial input process (step S21).

Next, whether or not an available buffer is present in a plurality of work buffers 12 previously provided in the main memory 4 is checked by the block fetching section 14 (step S22), and if the available buffer is detected, a data block is read out from the external file 6 according to the sort order of the representative records in the index area 8 and sequentially stored into the available buffer (step S24). The process up to this step is schematically shown in FIG. 8.

If the data blocks are stored into all of the work buffers 12, the sort output section 16 checks the representative record of a data block to be next fetched with reference to the index area 8, fetches records having a sort order equal to or higher than that of the representative record to be next fetched from the work buffer 12, and transfers the records into the output buffer 10 of the main memory 4 while merging the same (step S25).

Next, when all of the records having a sort order higher than the representative record of the data block to be next fetched are transferred into the output buffer 10, the block fetching section 14 checks whether or not a sorted data block which is not yet processed is present in the external file 6 (step S26), and if an unprocessed data block remains, the step S22 is effected again and whether or not an available buffer is present in the work buffers 12 is checked.

If all of the data records in one of the work buffers 12 are transferred into the output buffer 10 and an available buffer is provided in the immediately preceding step S25, the block fetching section 14 fetches a data block corresponding to the next representative record from the external file 6 into the available work buffer 12 in the step S24.

Figure 9:
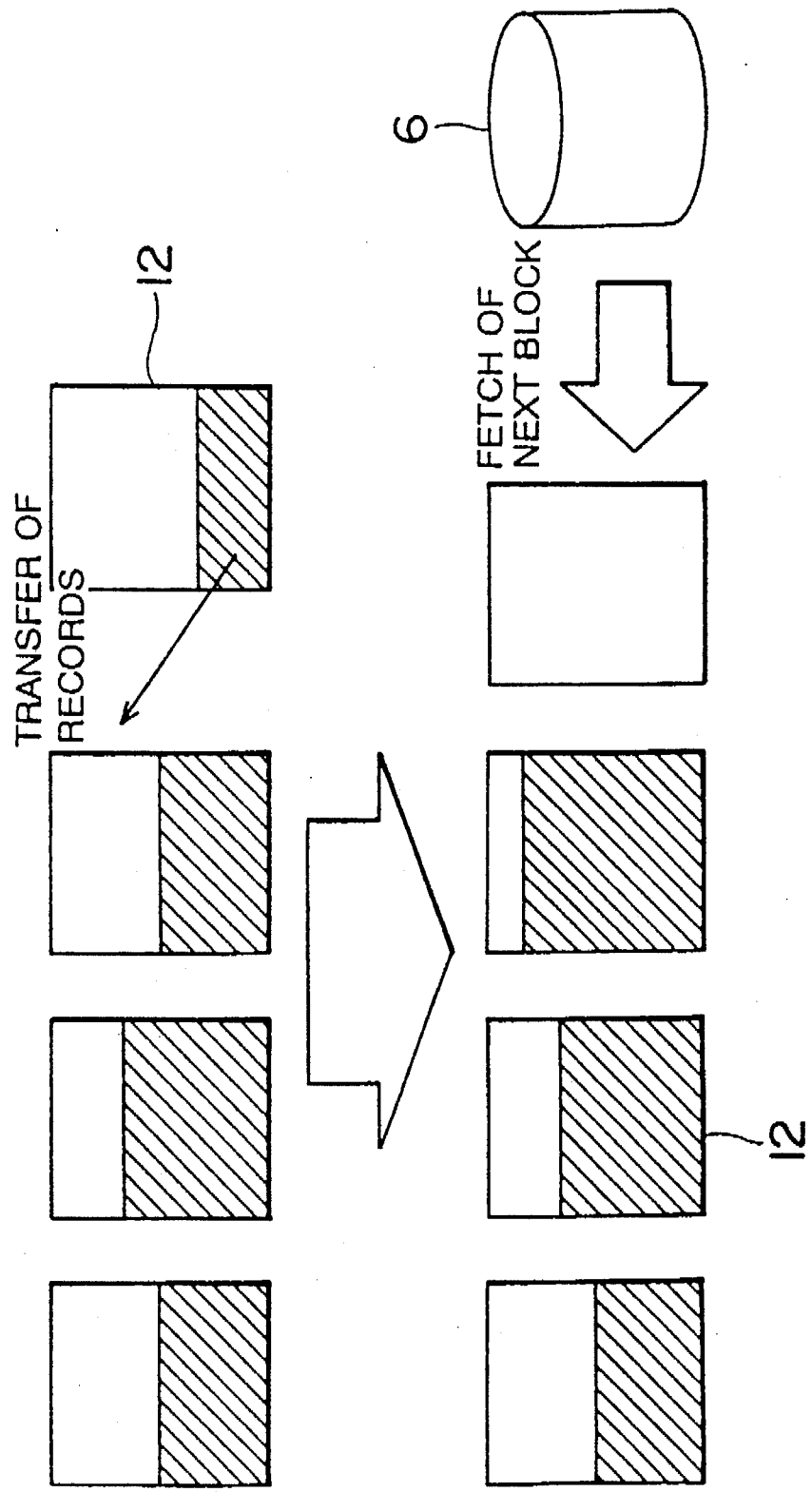
FIG. 9 is a schematic diagram showing the process of transferring a data record between work buffers to illustrate the merge process in the system of FIG. 5.

When the step S22 is effected again after the step S26 and if no available buffer is present in the work buffers 12 as schematically shown in FIG. 9, the data transferring section 18 selects a specified one of the work buffers 12 and transfers data records in the selected work buffer 12 into one of the other work buffers 12 so as to make the selected work buffer available (step S23). At this time, it is preferable to select one of the work buffers 12 having the smallest number of data records stored therein as the work buffer of transferring source whose data records are transferred to the other work buffers. However, for simplifying the process, it is possible to select one of the work buffers 12 in which the data block is first fetched, that is, which has the oldest data stored therein as the work buffer 12 of transferring source instead of checking the number of remaining data records. Likewise, it is preferable to preferentially select one of the other work buffers 12 which stores a smaller number of remaining data records as the work buffer of data record transferring destination. In this case, for simplifying the process, it is possible to preferentially select one of the other work buffers 12 in which older data is stored as the work buffer 12 of data record transferring destination. For the work buffer 12 of data record transferring destination, data records in the work buffer 12 are sorted in the sort order.

As shown in FIG. 9, a data block corresponding to the representative record having a next sort order is transferred from the external file 6 into the thus created available buffer in the step S24.

As described above, the merge process can be effected by effecting the record transferring operation by substantially the same number of times as in the case of buffer merge, or even in the worst case, by effecting the record transferring operation by the number of times less than in the case of block merge.

An example of treatment of data records in the work buffers 12 is explained in detail with reference to FIG. 10.

Figure 10:
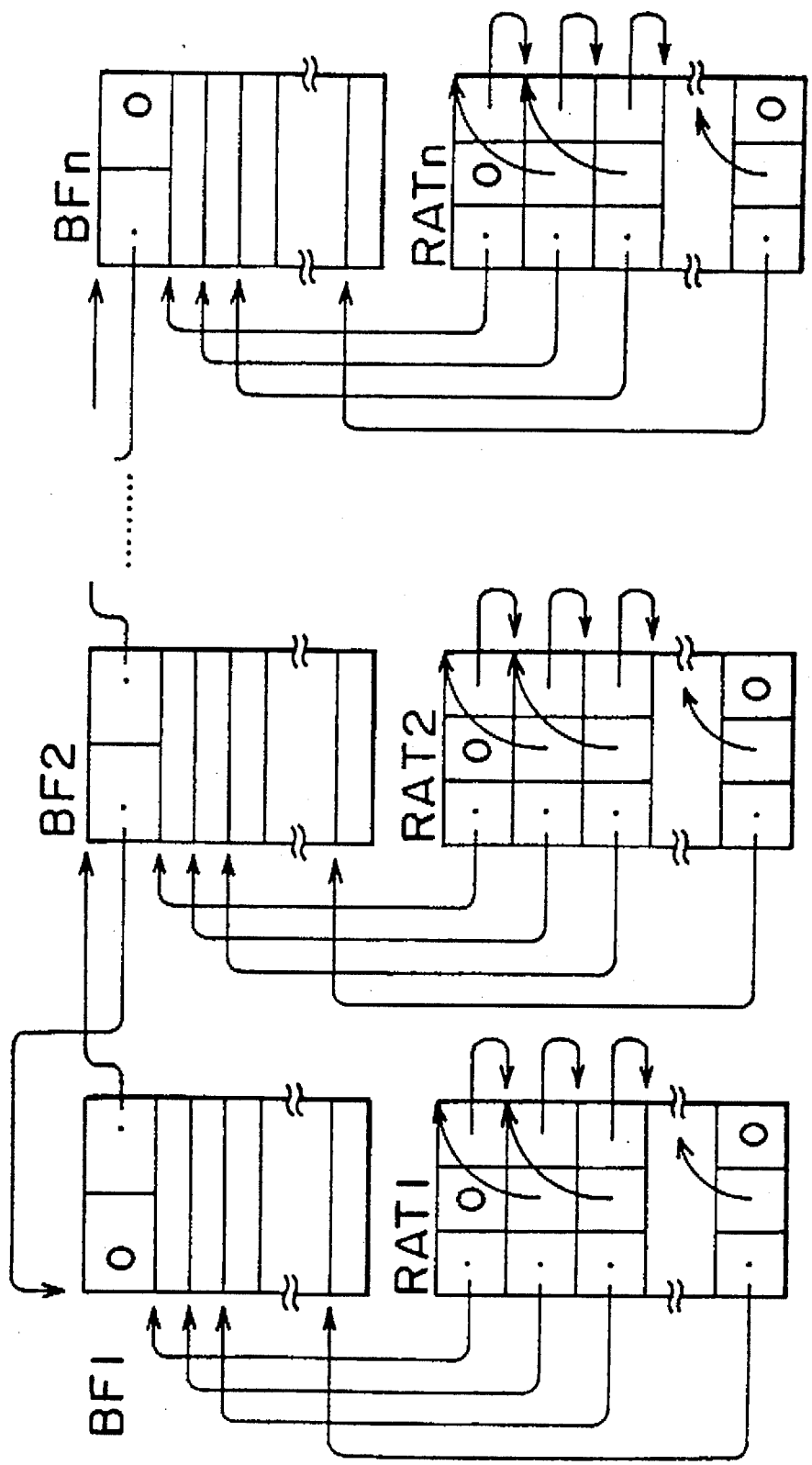
FIG. 10 is a schematic diagram showing an example of the construction of a work buffer to illustrate the merge process in the system of FIG. 5.

As shown in FIG. 10, record administration tables RAT1 to RATn for administering records in corresponding buffers 1 to n are provided for respective buffers BF1 to BFn constructing the work buffers 12 and all of the processes are effected by use of the record administration tables RAT1 to RATn. In each of the buffers BF1 to BFn, the pointer address of an immediately preceding buffer (that is, an adjacent and high-order buffer) and the pointer address of an immediately succeeding buffer (that is, an adjacent and low-order buffer) are stored in addition to the data record group so that the buffers can be address-chained in the sort order of the representative records. That is, the pointer addresses in the immediately preceding buffers construct an address chain of ascending order and the pointer addresses in the immediately succeeding buffers construct an address chain of descending order.

Further, in each of the record administration tables RAT1 to RATn, a pointer address indicating the address of each data record of a corresponding one of the buffers BF1 to BFn, a pointer address corresponding to the immediately preceding record in the sort order, and a pointer address corresponding to the next record in the sort order are stored for each record. That is, the pointer address corresponding to the immediately preceding record in the sort order constructs a chain of ascending order and the pointer address corresponding to the next record in the sort order constructs a chain of descending order.

Therefore, in this case, it is not necessarily required to arrange the data records in the buffers BF1 to BFn in the sort order, but they are connected in the sort order by the chain.

At the time of sort output, the comparing process is effected by use of information in the record administration tables RAT1 to RATn pointing the head record (which is a record having the highest order in the buffer and is a representative record) in each of the buffers BF1 to BFn so as to determine a record which has the highest sort order in the head records in the buffers BF1 to BFn. If the record having the highest sort order is detected to be higher in the sort order than the representative record of a data block to be next fetched, the record is output to the output buffer. After one record is output, a next record in the buffer (which is one of the buffers BF1 to BFn) in which the output record has been stored is subjected to the same process as described above as a to-be-compared record. The same process is sequentially effected, and when an available buffer is obtained, the data block of a next representative record is fetched into the available buffer.

If data to be output is no more present in the buffers BF1 to BFn, an available buffer into which a next data block is fetched is formed by transferring the records in the buffer as shown in FIG. 9. At this time, the number of record transferring operations effected can be reduced by transferring records in a buffer which stores the smallest number of records or which is predicted to store the smallest number of records (for example, a buffer which stores the oldest data) to another buffer as described before. At the time of data transfer, a chain in a corresponding one of the record administration tables RAT1 to RATn and a chain between the buffers BF1 to BFn are corrected.

In a case where data blocks to be newly fetched are no more present in the external file 6, the available buffer is not treated as an object to be processed and then the process is continued. When all of the buffers become available or vacant, it is determined that all of the records are output and the process is ended.

In the above sort processing system, the high-speed merge process can be efficiently effected by use of a relatively small number of buffers and a smaller number of record transferring operations effected in the work area when all the data is sorted by temporarily fetching a plurality of sorted data blocks constructed by data groups which are previously discretely sorted into a plurality of work buffers, sequentially reading out and outputting data records from the plurality of work buffers while merging the same.

In the above sort processing system, there occurs a case wherein transfer of data records between the work buffers 12 cannot be effected depending on the capacity of each of the work buffers 12 and the number of sorted data blocks when all of the records having a sort order higher than the representative record of a data block to be next fetched are transferred to the output buffer 10. It is possible to cope with the above case in the second embodiment of this invention described below.

<Second Embodiment>

Figure 11:
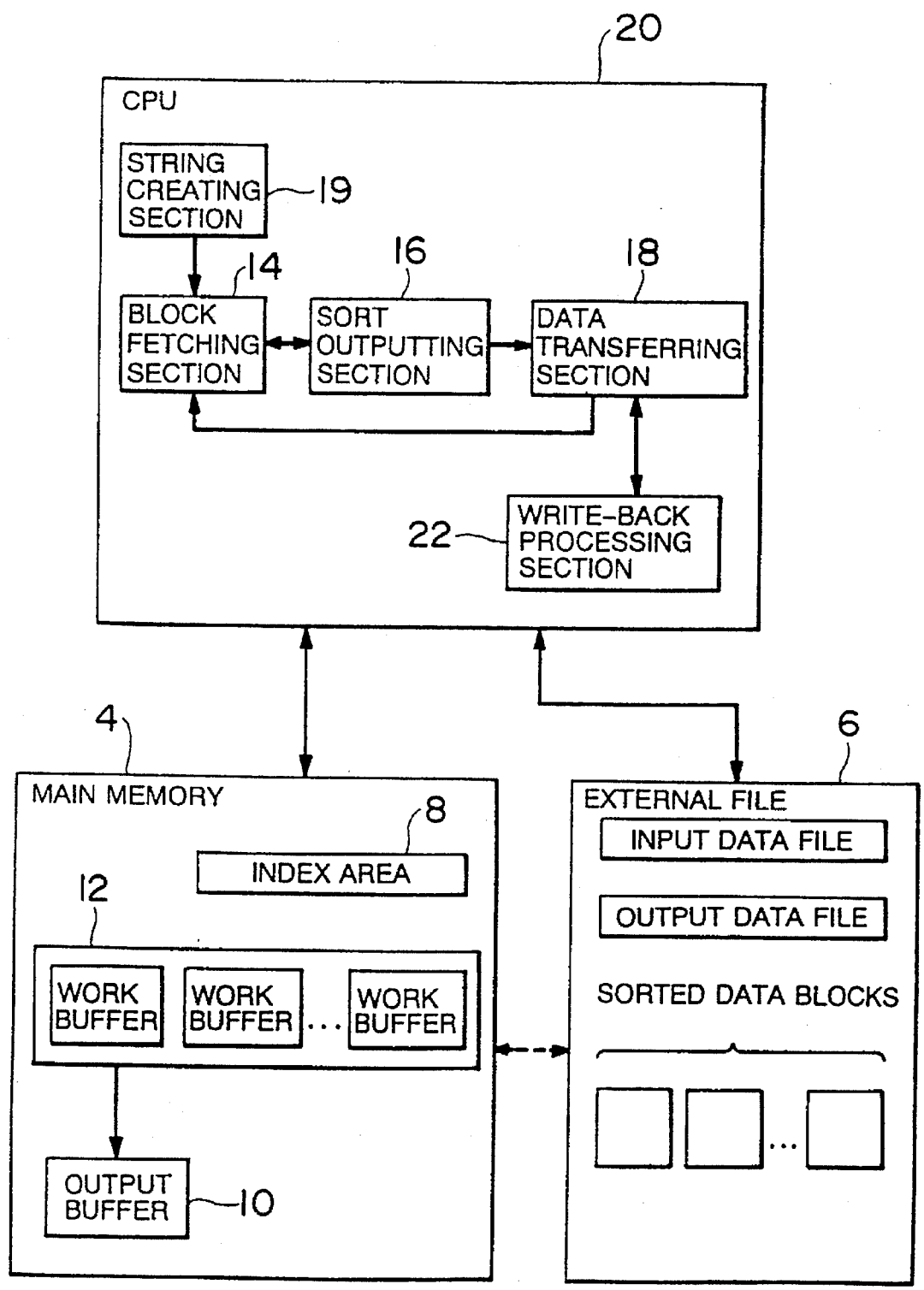
FIG. 11 is a block diagram showing the construction of a second embodiment of a sort processing system according to this invention.

FIG. 11 shows the construction of a sort processing system according to a second embodiment of this invention.

The sort processing system of FIG. 11 includes a CPU (Central Processing Unit) 20, and a main memory 4 and an external file 6 which are the same as the main memory 4 and external file 6 of FIG. 5.

The CPU 20 has a write-back processing section 22 in addition to a block fetching section 14, sort output section 16, data transferring section 18 and string creating section 19 which are substantially the same as the corresponding portions of FIG. 5.

The data transferring section 18 creates an available buffer by transferring all of the data records in one of the work buffers 12 into at least one of the other work buffers 12 in a case where the available buffer cannot be obtained in the work buffers 12 even by fetching and outputting all of the data records having a sort order higher than the representative record of a data block to be next fetched from the work buffers.

The write-back processing section 22 fetches data of one data block having a low sort order from a plurality of work buffers 12 when transfer of data records cannot be effected and temporarily writes the data back into the external file 6. The write-back data block is sorted, the representative block is merged and registered into the index area 10 and written back as one sorted data block.

Figure 12:
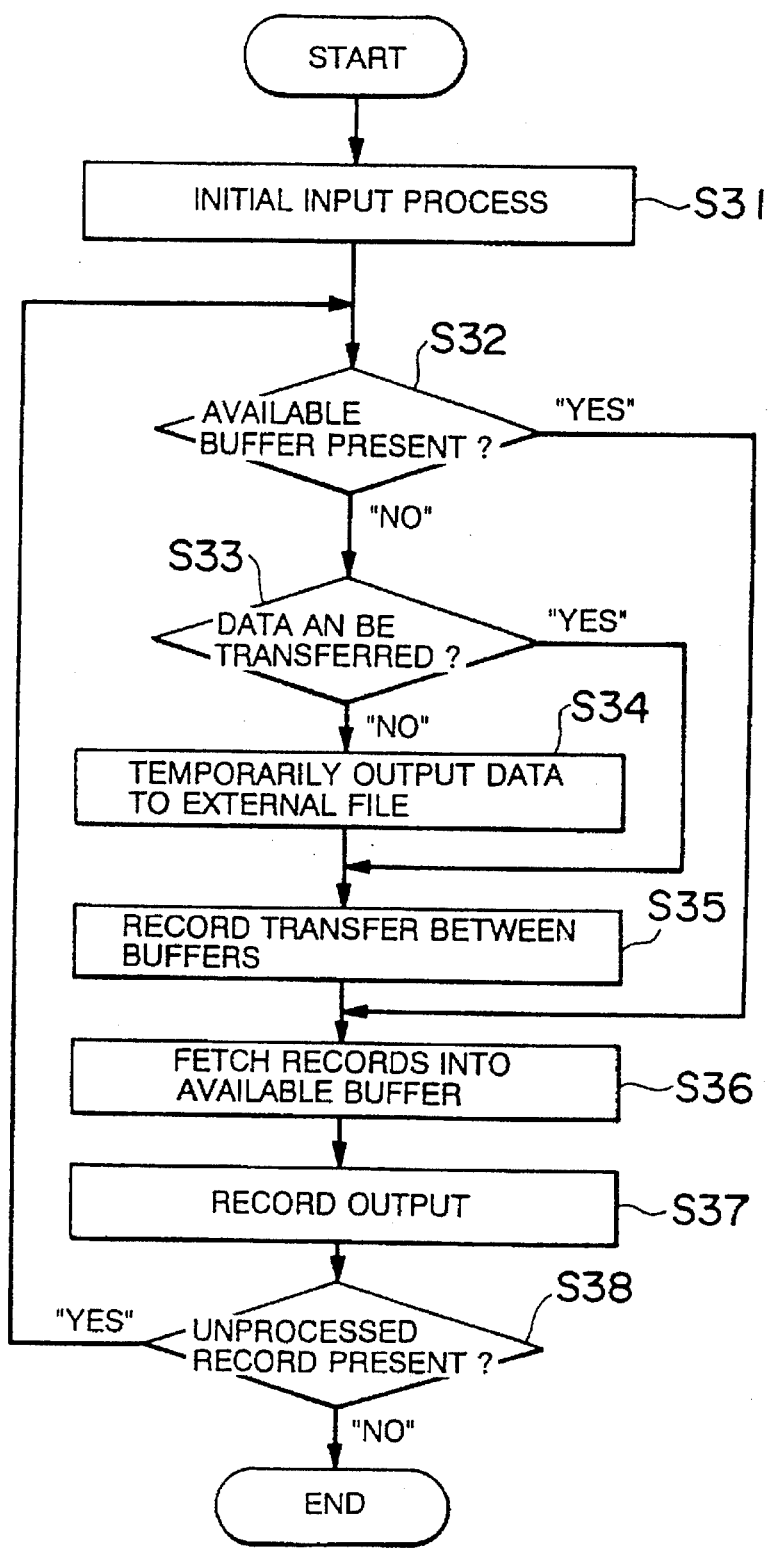
FIG. 12 is a flowchart for illustrating the merge process in the system of FIG. 11.

Next, the operation of the sort processing system with the construction as shown in FIG. 11 is explained with reference to the flowchart shown in FIG. 12 and the schematic diagrams shown in FIGS. 8, 9, 10 and 13.

The operation of this system is similar to that of the system of FIG. 5 in that the sort process includes the string creating process and the merge process and in the string creating process.

When the merge process is started, the block fetching section 14 first fetches the representative records of the respective data blocks, that is, indices into the representative record fetching index area 8 of the main memory 4 and sorts the representative records in the index area 8 in a sort order as an initial input process (step S31).

Next, whether or not an available buffer is present in a plurality of work buffers 12 previously provided in the main memory 4 is checked by the block fetching section 14 (step S32), and if the available buffer is detected, data blocks are read out from the external file 6 in a sort order of the representative records in the index area 8 and sequentially stored into the available buffer (step S36). The process up to this step is schematically shown in FIG. 8.

If the data blocks are stored into all of the work buffers 12, the sort output section 16 checks the representative record of a data block to be next fetched with reference to the index area 8, fetches records having a sort order equal to or higher than that of the representative record to be next fetched from the work buffer 12, and sequentially transfers the records into the output buffer 10 of the main memory 4 while merging the same (step S37).

When all of the records having a sort order higher than the representative record of the data block to be next fetched is transferred into the output buffer 10, the block fetching section 14 checks whether or not a sorted data block which is not yet processed is present in the external file 6 (step S38), and if an unprocessed data block is present, the step S22 is effected again and whether or not an available buffer is present in the work buffers 12 is checked.

If all of the data records in one of the work buffers 12 are transferred into the output buffer 10 and an available buffer is provided in the step S37, the block fetching section 14 fetches a data block corresponding to the next representative record from the external file 6 into the available work buffer 12 in the step S36.

When the step S32 is effected again after the step S38 and if no available buffer is present in the work buffers 12 as shown in FIG. 9, the write-back processing section 22 checks whether data transfer between the work buffers 12 can be effected or not (step S33), and if the data transfer can be effected, the data transferring section 18 selects a specified one of the work buffers 12 and transfers data records in the selected work buffer 12 into one of the other work buffers 12 so as to make the selected work buffer available (step S35). At this time, it is preferable to select one of the work buffers 12 having the smallest number of data records stored therein as the work buffer of transferring source whose data records are transferred to one of the other work buffers. However, for simplifying the process, it is possible to select one of the work buffers 12 in which the data blocks are first fetched, that is, which has the oldest data stored therein as the work buffer 12 of transferring source instead of checking the number of remaining data records. Likewise, it is preferable to preferentially select one of the other work buffers 12 which stores a smaller number of remaining data records as the work buffer of data record transferring destination. In this case, for simplifying the process, it is possible to preferentially select one of the other work buffers 12 in which older data is stored as the work buffer 12 of data record transferring destination. For the work buffer 12 of data record transferring destination, data records in the work buffer 12 are sorted in the sort order.

A data block corresponding to the representative record having a next sort order is transferred from the external file 6 into the thus created available buffer in the step S36 as shown in FIG. 9.

If it is determined in the step S33 that the data transferring section 18 cannot transfer data between the work buffers 12, the write-back processing section 22 selects and extracts data records of one block having a low sort order from the respective work buffers 12 to create a data block BL and temporarily writes the data block back into the external file 6 as shown in FIG. 13 (step S34). Further, in the step S35, data transfer between the work buffers 12 is effected by the data transferring section 18 to make an available buffer. For the block of data records having a low sort order output to the external buffer 6, the representative record thereof is merged with the representative record string of the index area 8 and the result of merge is registered into the index area so that it can be input again like the other sorted data block when required.

As described above, the limitation of the application range which was a problem in the buffer merge can be eliminated and the merge process can be effected by effecting the record transferring operation by substantially the same number of times as in the case of buffer merge, or even in the worst case, by effecting the record transferring operation by the number of times less than in the case of block merge.

An example of treatment of data records in the work buffers 12 taken in this case is explained in detail with reference to FIG. 10.

As shown in FIG. 10, record administration tables RAT1 to RATn for administering records in corresponding buffers 1 to n are provided for respective buffers BF1 to BFn constructing the work buffers 12 and all of the processes are effected by use of the record administration tables RAT1 to RATn. In each of the buffers BF1 to BFn, the pointer address of an immediately preceding buffer and the pointer address of an immediately succeeding buffer are stored in addition to the data record group so that the buffers can be address-chained in the sort order of the representative records. That is, the pointer addresses in the immediately preceding buffers construct an address chain of ascending order and the pointer addresses in the immediately succeeding buffers construct an address chain of descending order.

Further, in each of the record administration tables RAT1 to RATn, a pointer address indicating the address of each data record of a corresponding one of the buffers BF1 to BFn, a pointer address corresponding to the immediately preceding record in the sort order, and a pointer address corresponding to the next record in the sort order are stored for each record. That is, the pointer address corresponding to the immediately preceding record in the sort order constructs a chain of ascending order and the pointer address corresponding to the next record in the sort order constructs a chain of descending order.

Therefore, in this case, it is not necessarily required to arrange the data records in the buffers BF1 to BFn in the sort order, but they are connected in the sort order by the chain.

At the time of sort output, the comparing process is effected by use of information in the record administration tables RAT1 to RATn pointing the head record (which is a representative record) in each of the buffers BF1 to BFn so as to determine a record which has the highest sort order in the head records in the buffers BF1 to BFn. If the record having the highest sort order is detected to be higher in the sort order than the representative record of a data block to be next fetched, the record is output to the output buffer. After one record is output, a next record in the buffer (which is one of the buffers BF1 to BFn) in which the output record has been stored is subjected to the same process as described above as a to-be-compared record. The same process is sequentially effected, and when an available buffer is obtained, the data block of a next representative record is fetched into the available buffer.

If data to be output is no more present in the buffers BF1 to BFn, an available buffer into which a next data block is fetched is formed by transferring the records in the buffer as shown in FIG. 9. At this time, the number of record transferring operations to be effected can be reduced by transferring records in a buffer which stores the smallest number of records or which is predicted to store the smallest number of records (for example, a buffer which stores the oldest data) to another buffer as described before. At the time of data transfer, a chain in a corresponding one of the record administration tables RAT1 to RATn and a chain between the buffers BF1 to BFn are corrected.

As shown in FIG. 13, in a case where a large number of records remain in all of the work buffers 12 and all of the records cannot be transferred, that is, all of the records cannot be transferred into the other buffers, data records of one block having a low sort order is extracted from the work buffers 12 and written back into the external file 6. In this case, it is possible to extract the same amount of data having the low sort order from each of the work buffers 12 or extract different numbers of data records from the respective work buffers 12. For example, it is possible to extract a large number of data records from the buffer having a large number of data records stored therein according to the number of remaining data records for each buffer or extract a large amount of data from a specified buffer. This process is also effected by use of the record administration tables RAT1 to RATn and records are transferred into space areas of the work buffers 12 made by the write-back process so as to make an available buffer.

Also, in this case, if data blocks to be newly fetched are no more present in the external file 6, the available buffer is not treated as an object to be processed and then the process is continued. When all of the buffers become available or vacant, it is determined that all of the records are output and the process is ended.

Therefore, in the above sort processing system, in a case where all of the data records in one of the plurality of work buffers cannot be transferred to at least one of the other work buffers, data of one data block having a low sort order is extracted from the plurality of work buffers and temporarily written back into the external file so that the highly efficient and high-speed merge process can be attained by use of a smaller number of work buffers while the processible data amount is prevented from being limited by the capacity of the work buffer.

It is apparent that, in this invention, a wide range of different working modes can be formed based on the invention without deviating from the spirit and scope of the invention.

What is claimed is:

1. A sort processing method of sorting all data by creating a plurality of sorted data blocks based on input data, temporarily fetching the data blocks into a plurality of work buffers and sequentially reading out and outputting data records from the plurality of work buffers while merging the same, comprising:

a step of creating a plurality of sorted data blocks based on input data;

a block fetching step of sequentially fetching a plurality of data blocks into an available buffer in a plurality of work buffers in an order corresponding to the sort order of representative records constructed by data items having the highest sort order in the respective data blocks;

a sort outputting step of fetching data records which have a sort order higher than the representative record of a data block to be next fetched into the work buffer from the work buffers in the sort order and sequentially outputting the data records; and a data transferring step of providing an available buffer by transferring all of the data records in one of the plurality of work buffers into at least one of the other work buffers and sorting data records in each of at least one work buffer to which data records are added by the transferring in a case where the available buffer cannot be obtained even by fetching and outputting all of the data records which have a sort order higher than the representative record of the data block to be next fetched from the work buffers.

2. A sort processing method of sorting all data by creating a plurality of sorted data blocks based on input data, temporarily fetching the data blocks into a plurality of work buffers and sequentially reading out and outputting data records from the plurality of work buffers while merging the data blocks, comprising:

a step of creating a plurality of sorted data blocks based on input data;

a block fetching step of sequentially fetching a plurality of data blocks into an available buffer in a plurality of work buffers in an order corresponding to the sort order of representative records constructed by data items having the highest sort order in the respective data blocks;

a sort outputting step of fetching data records which have a sort order higher than the representative record of a data block to be next fetched into the work buffer from the work buffers in the sort order and sequentially outputting the data records;

a data transferring step of providing an available buffer by transferring all of the data records in one of the plurality of work buffers into at least one of the other work buffers and sorting data records in each of at least one work buffer to which data records are added by the transferring in a case where the available buffer cannot be obtained even by fetching and outputting all of the data records which have a sort order higher than the representative record of the data block to be next fetched from the work buffers; and a write-back step of fetching data of one data block having a low sort order from the plurality of work buffers, temporarily writing the data back into an external file, and then effecting said data transferring step again in a case where all of the data records in one of the plurality of work buffers cannot be transferred into at least one of the other work buffers in said data transferring step.

3. A method according to claim 1, wherein said data transferring step includes a step of selecting one of the plurality of work buffers which is first subjected to the data record fetching process as a work buffer of data record transferring source.

4. A method according to claim 1, wherein said data transferring step includes a step of selecting one of a plurality of work buffers which stores the smallest number of remaining data records as a work buffer of data record transferring source.

5. A method according to claim 3, wherein said data transferring step includes a step of selecting at least one work buffer as a work buffer of data record transferring destination in the order in which the data block is fetched from a plurality of work buffers except the work buffer of data record transferring source.

6. A method according to claim 3, wherein said data transferring step includes a step of selecting at least one work buffer as a work buffer of data record transferring destination from a plurality of work buffers except the work buffer of data record transferring source in the order in which the number of remaining data records stored in the work buffer is increased.

7. A method according to claim 2, wherein said write-back step is a step of fetching data records having a low sort order among the data records in the respective buffers by a preset equal number from the plurality of work buffers and writing the fetched data records back into an external file.

8. A sort processing apparatus comprising:
string creating means for creating a plurality of sorted data blocks based on input data;
an external file for storing the plurality of sorted data blocks and sort result output data;
a plurality of work buffers for temporarily storing the sorted data blocks fetched from said external file;
an output buffer for temporarily storing sort result output data and then supplying the same to said external file;
block fetching means for sequentially fetching the plurality of data blocks in order corresponding to the sort order of representative records constructed by data items having the highest sort order in the respective data blocks and storing the same into an available one of said plurality of work buffers;
sort outputting means for fetching data records which have a sort order higher than the representative record of a data block to be next fetched into said work buffer from said work buffers in the sort order and sequentially outputting the data records to said output buffer; and
data transferring means for transferring all of the data records in one of said plurality of work buffers into at least one of the other work buffers and sorting data records in each of at least one work buffer to which data records are added by the transferring in a case where the available buffer cannot be obtained even by fetching and outputting all of the data records which have a sort order higher than the representative record of the data block to be next fetched from said work buffers.

9. A sort processing apparatus comprising:
string creating means for creating a plurality of sorted data blocks based on input data;
an external file for storing the plurality of sorted data blocks and sort result output data;
a plurality of work buffers for temporarily storing the sorted data blocks fetched from said external file;
an output buffer for temporarily storing sort result output data and then supplying the same to said external file;
block fetching means for sequentially fetching the plurality of data blocks in order corresponding to the sort order of representative records constructed by data items having the highest sort order in the respective data blocks and storing the same into an available one of said plurality of work buffers;
sort outputting means for fetching data records which have a sort order higher than the representative record of a data block to be next fetched into said work buffer from said work buffers in the sort order and sequentially outputting the data records to said output buffer;
data transferring means for transferring all of the data records in one of said plurality of work buffers into at least one of the other work buffers and sorting data records in each of at least one work buffer to which data records are added by the transferring in a case where the available buffer cannot be obtained even by fetching and outputting all of the data records which have a sort order higher than the representative record of the data block to be next fetched from said work buffers; and
write-back means for fetching data of one data block having a low sort order from said plurality of work buffers and temporarily writing the data back into said external file in a case where said data transferring section cannot transfer all of the data records in one of said plurality of work buffers into at least one of the other work buffers.

10. An apparatus according to claim 8, wherein said data transferring means includes means for selecting one of the plurality of work buffers which is first subjected to the data record fetching process as a work buffer of data record transferring source.

11. An apparatus according to claim 8, wherein said data transferring means includes means for selecting one of said plurality of work buffers which stores the smallest number of remaining data records as a work buffer of data record transferring source.

12. An apparatus according to claim 10, wherein said data transferring means includes means for selecting at least one work buffer as a work buffer of data record transferring destination in an order in which the data block is fetched from said plurality of work buffers except the work buffer of data record transferring source.

13. An apparatus according to claim 10, wherein said data transferring means includes means for selecting at least one work buffer as a work buffer of data record transferring destination from said plurality of work buffers except the work buffer of data record transferring source in the order in which the number of remaining data blocks stored in said work buffer is increased.

14. An apparatus according to claim 9, wherein said write-back section includes means for fetching data records having a low sort order among the data records in the respective buffers by a preset equal number from said plurality of work buffers and writing the fetched data records back into said external file.

* * * * *

UNITED STATES PATENT AND TRADEMARK OFFICE
CERTIFICATE OF CORRECTION

PATENT NO. : 5,659,733
DATED : August 19, 1997
INVENTOR(S) : Haruhisa YAMASHITA

It is certified that error appears in the above-indentified patent and that said Letters Patent is hereby corrected as shown below:

ON THE TITLE PAGE:

ITEM [30], Foreign Application Priority Data, change "Sep. 26, 1994" to --Aug. 16, 1994--.

Col. 9, line 56, change "Corresponding" to --corresponding--.

Signed and Sealed this

Twenty-eighth Day of October, 1997

Attest:

BRUCE LEHMAN

Attesting Officer

Commissioner of Patents and Trademarks